April 2, 1935.　　　A. K. H. GERMUNDSON　　　1,996,701
MECHANICAL CALENDAR
Filed Dec. 16, 1932　　　10 Sheets-Sheet 1
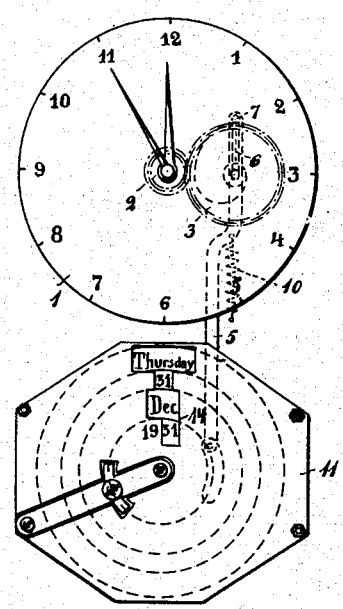
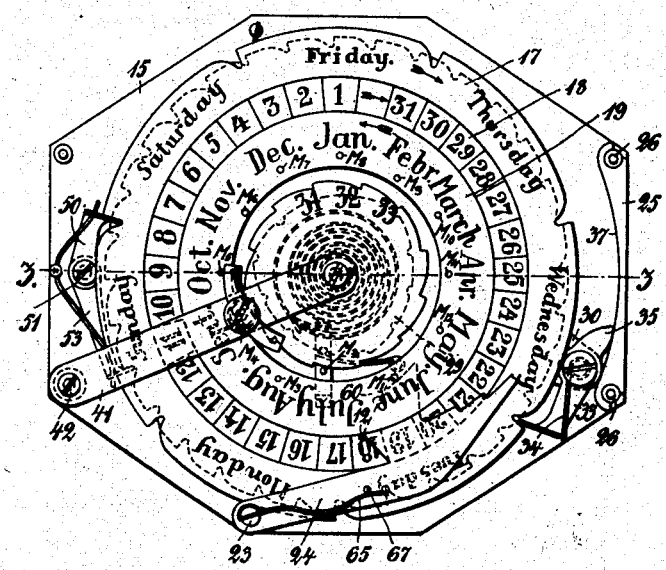
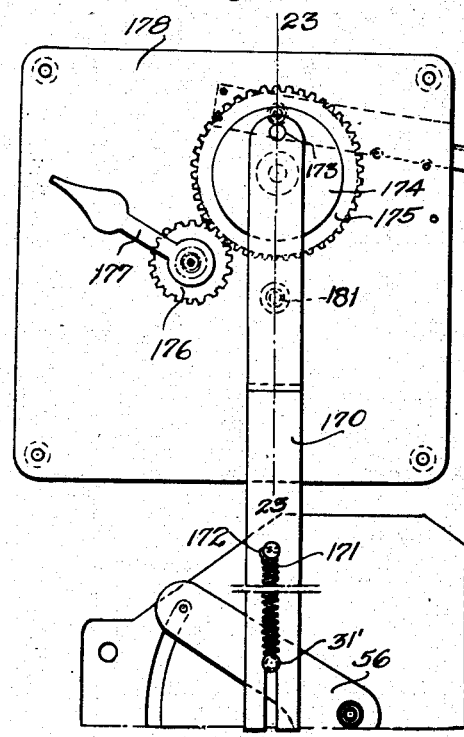
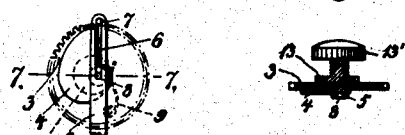
Inventor
Agne Knies Herbert Germundson
by
Fisher Pedersen,
Attorneys.

April 2, 1935.　　A. K. H. GERMUNDSON　　1,996,701
MECHANICAL CALENDAR
Filed Dec. 16, 1932　　10 Sheets-Sheet 2
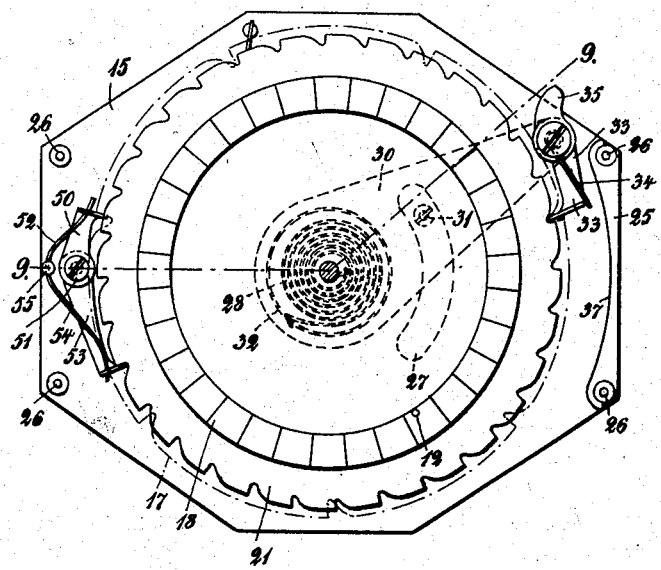
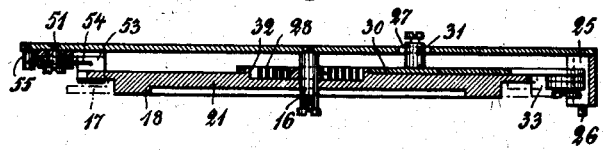
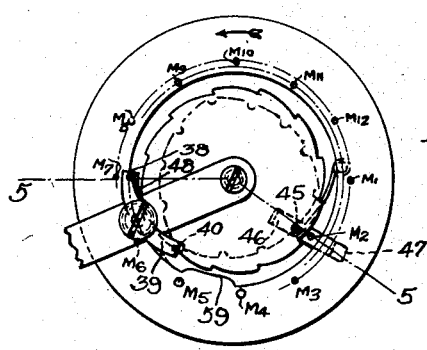

April 2, 1935.    A. K. H. GERMUNDSON    1,996,701
MECHANICAL CALENDAR
Filed Dec. 16, 1932    10 Sheets-Sheet 3
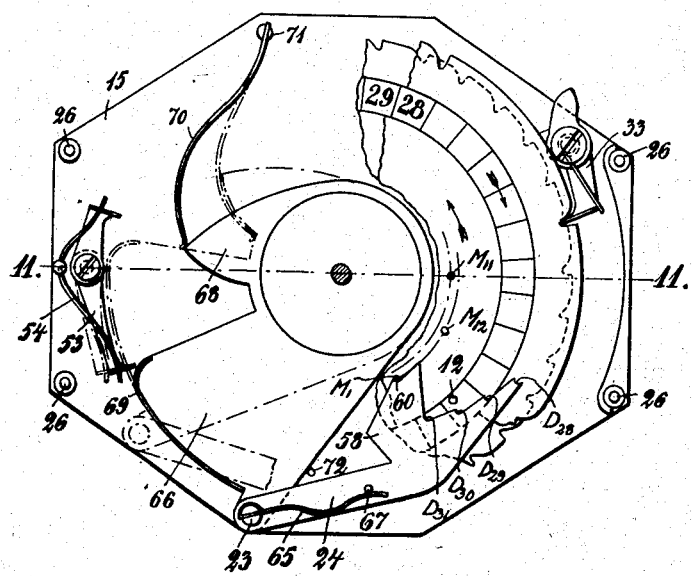
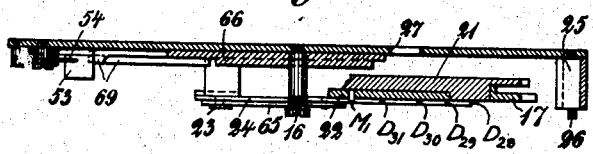

April 2, 1935.    A. K. H. GERMUNDSON    1,996,701
MECHANICAL CALENDAR
Filed Dec. 16, 1932    10 Sheets-Sheet 4
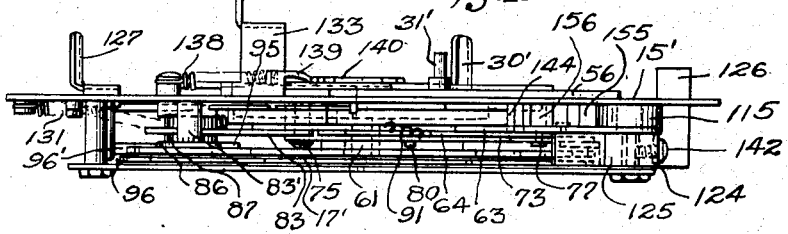
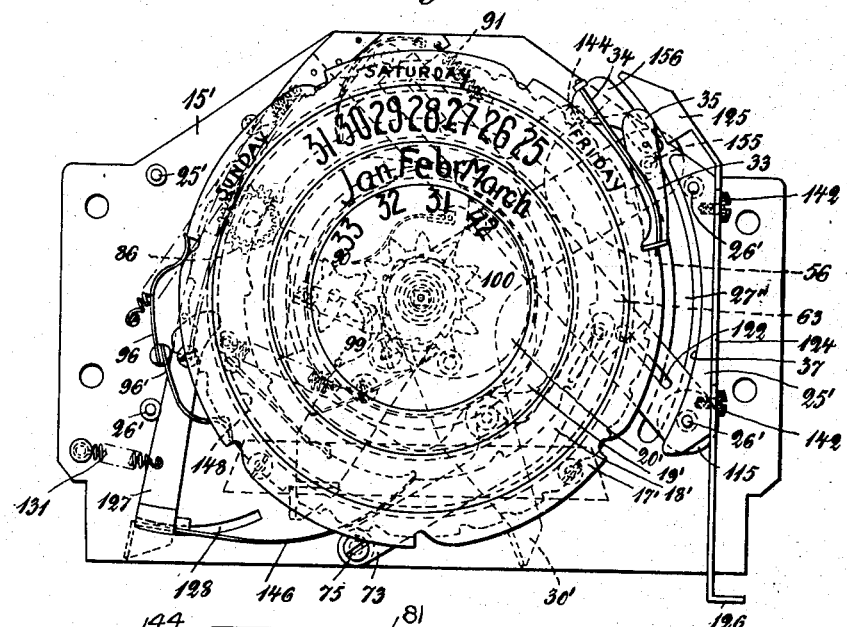
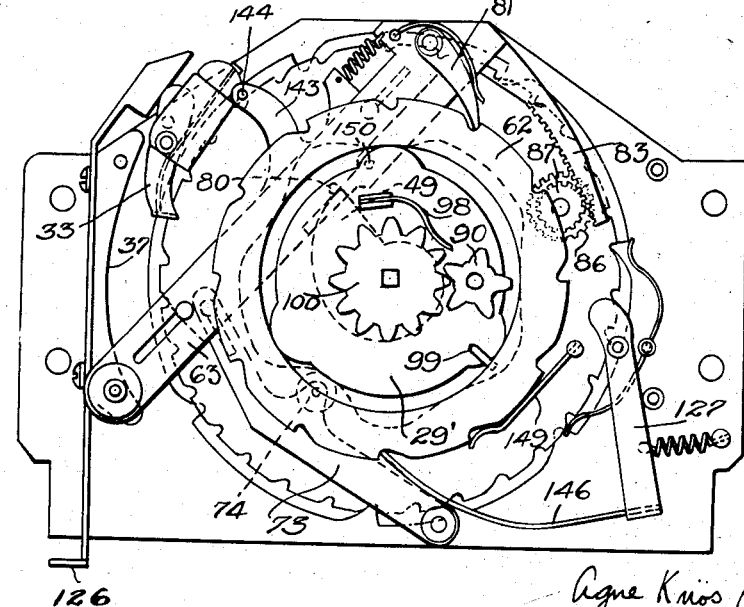

April 2, 1935.  A. K. H. GERMUNDSON  1,996,701
MECHANICAL CALENDAR
Filed Dec. 16, 1932   10 Sheets-Sheet 5
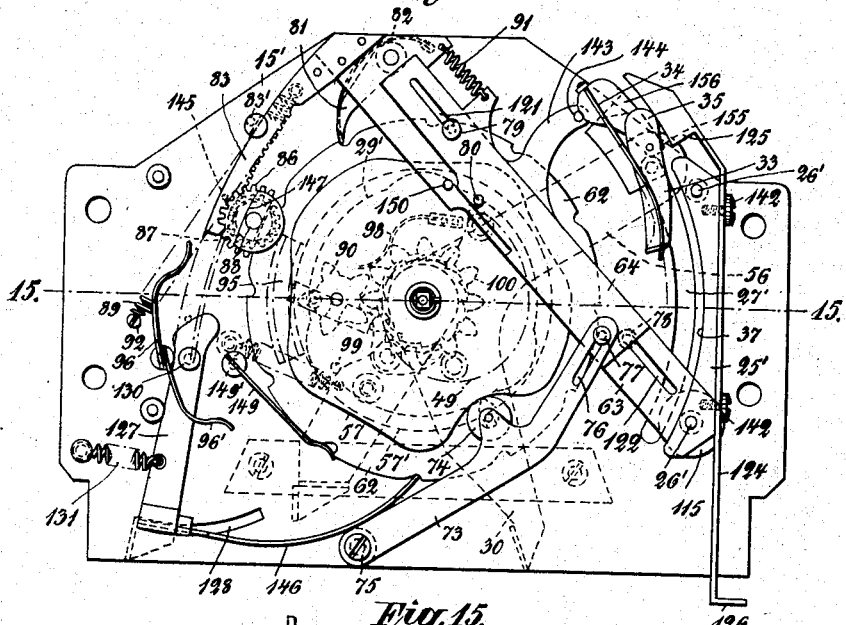
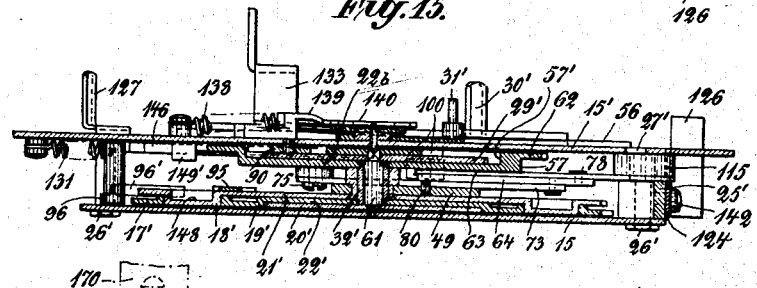
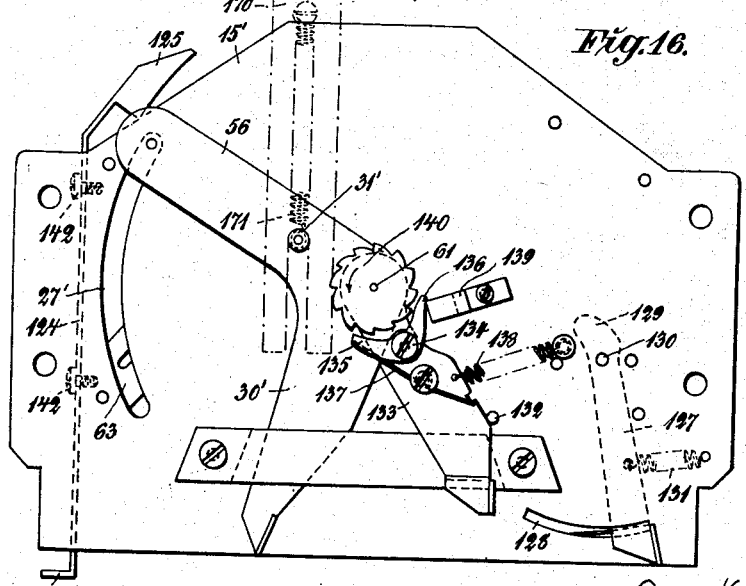
Inventor
Agne Knös Herbert Germundson
by Fisher & Pedersen
Attorneys.

April 2, 1935.  A. K. H. GERMUNDSON  1,996,701
MECHANICAL CALENDAR
Filed Dec. 16, 1932　　10 Sheets-Sheet 6
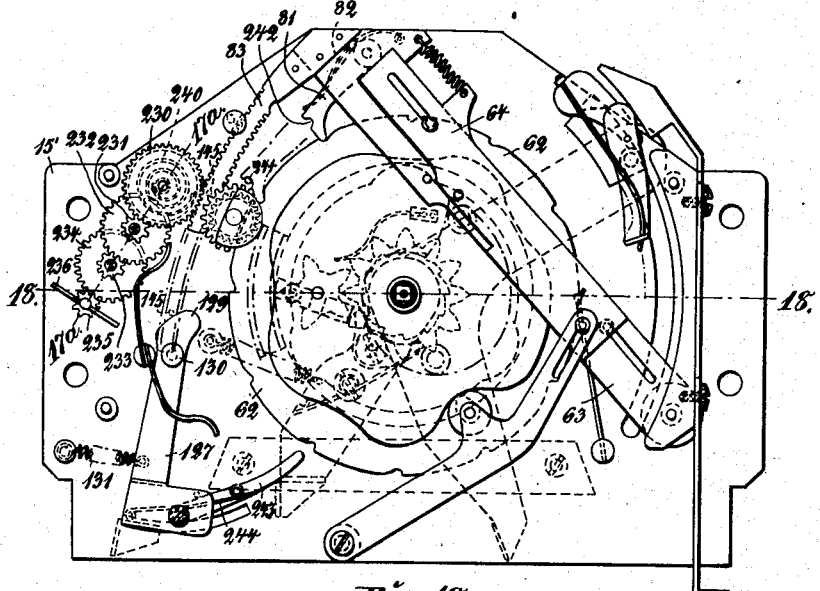
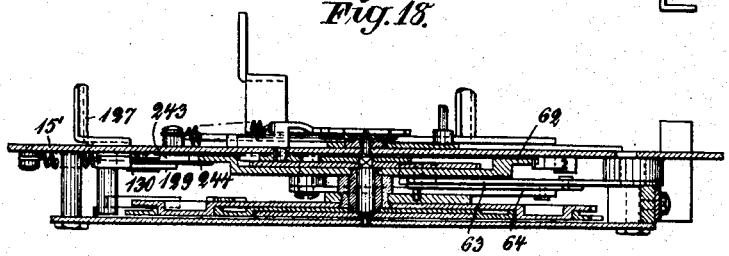
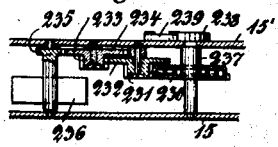 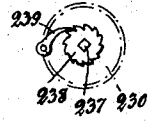

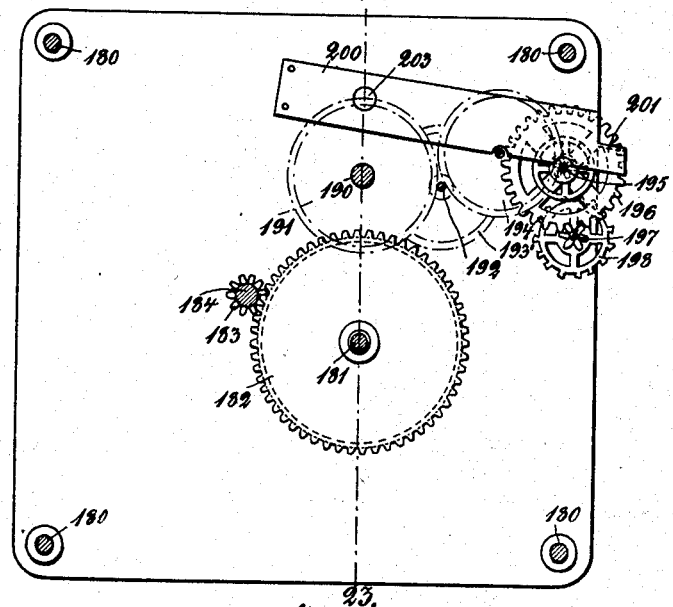
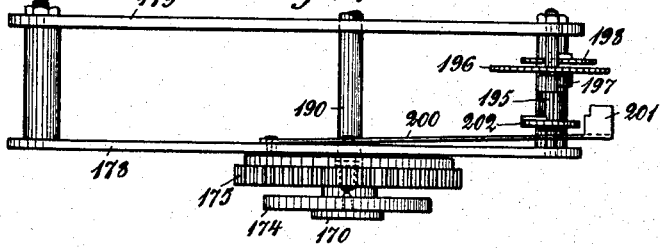

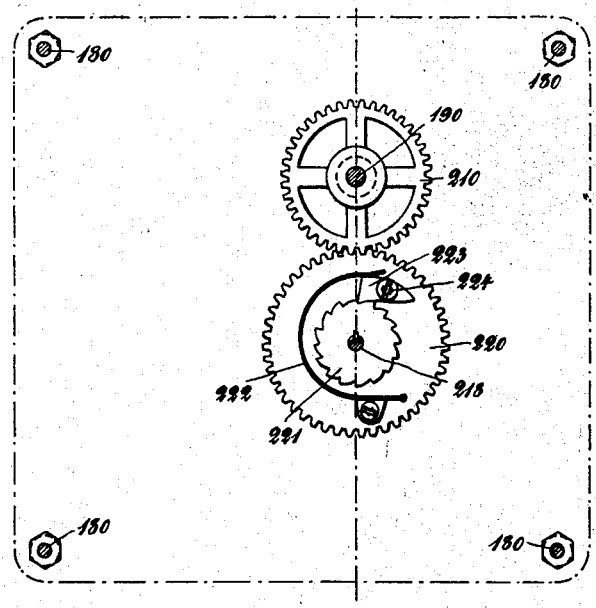
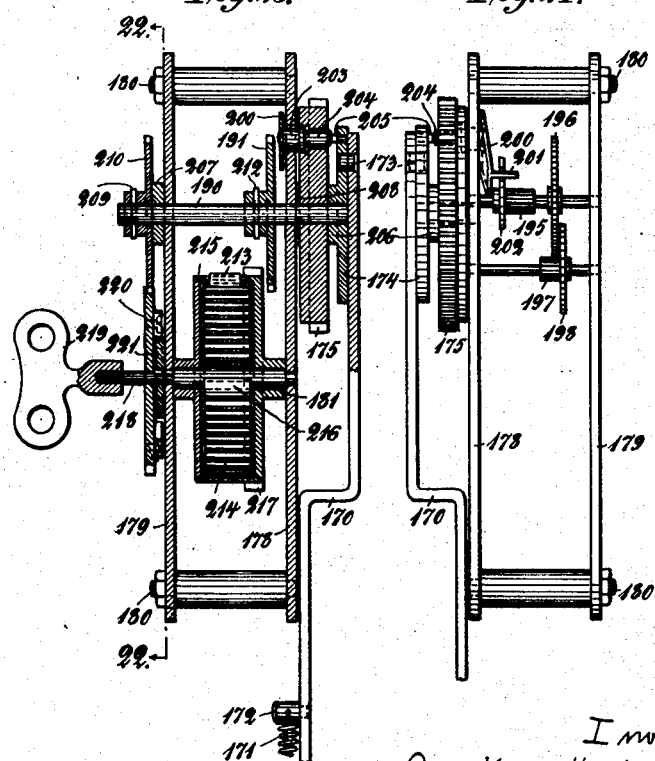

April 2, 1935.  A. K. H. GERMUNDSON  1,996,701
MECHANICAL CALENDAR
Filed Dec. 16, 1932  10 Sheets-Sheet 9
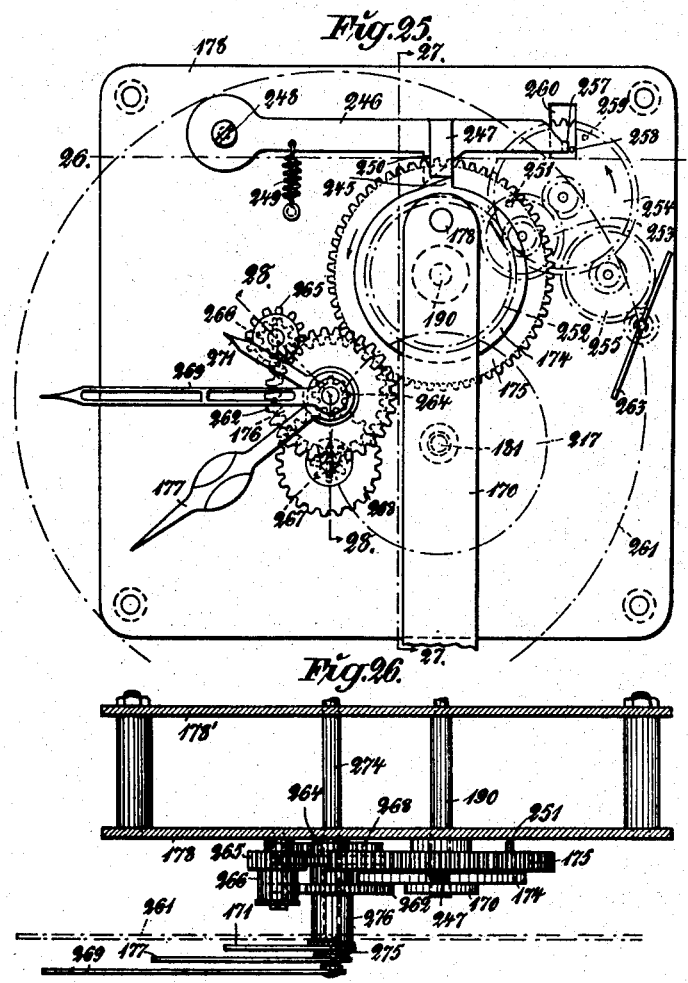
Inventor
Agne Knös Herbert Germundson
by Fisher and Pedersen,
Attorneys.

April 2, 1935. A. K. H. GERMUNDSON 1,996,701
MECHANICAL CALENDAR
Filed Dec. 16, 1932 10 Sheets-Sheet 10
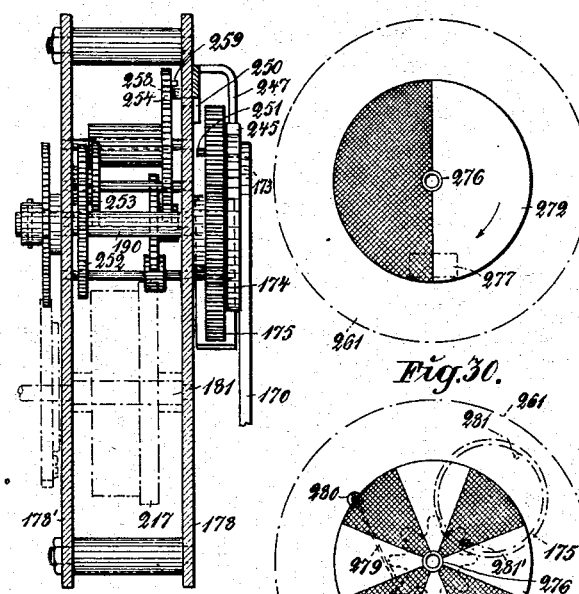

Patented Apr. 2, 1935

1,996,701

UNITED STATES PATENT OFFICE 1,996,701

MECHANICAL CALENDAR

Agne Knös Herbert Germundson, Stockholm, Sweden, assignor to Aktiebolaget Sparuret, Stockholm, Sweden, a company of Sweden Application December 16, 1932, Serial No. 647,660
In Sweden December 22, 1931

24 Claims. (Cl. 40—112)

The present invention relates to a mechanical calendar that indicates the single days of the week, date, month and year and is arranged to be driven during a long course of years, the calendar mechanism being provided with members which correct automatically for leap-years.

The invention relates, moreover, to driving means suitable for driving the calendar and being controlled for instance by ordinary clockworks.

The calendar comprises four coaxially journalled members cooperating with or acting as bearers of the plates of the calendar which are marked with a single series of names or ordinal numbers for the single days of the week, date, month and year, respectively. The date indicating member that is arranged to step on, in the course of the month, one step in twenty-four hours, is on a change of month automatically reset to its initial position by means of a for instance spring-loaded mechanism. Said resetting mechanism is arranged to be released under the control of a releasing member controlled by the months indicating member, for example a pivoted, in various positions adjustable arm which through its position determines the proper number of feeding steps for the date indicating member between two consecutive displacements of the months indicating member, the releasing member being in that way set by means of the months indicating member into four positions corresponding to the different number of days of the months.

The invention will be more closely described with reference to the accompanying drawings, which illustrate, by way of examples, two embodiments of the mechanical calendar according to the invention.

Figures 1 to 11 show one embodiment of the calendar.

Figure 1 shows schematically the calendar in combination with a clockwork.

Figure 2 shows a view of the calendar, the cover plate on the front side of the mechanism being left out, and Figure 3 the same embodiment in section through the line 3, 3 in Figure 2.

Figure 4 is a detail which shows the month and year plates, and Figure 5 shows the same plates in section through the line 5, 5 in Figure 4.

Figures 6 and 7 show a detail of the driving means used in combination with a clockwork.

Figure 8 shows a view of the date plate and Figure 9 a section through the line 9, 9 in Figure 8.

Figure 10 shows the feeding mechanism employed for the displacement of the month plate, as well as portions of the month, date and day plates, and Figure 11 the same parts in section through the line 11, 11 in Figure 10.

Figures 12 to 16 refer to another embodiment of the mechanical calendar.

Figure 12 shows a view of the calendar, the cover plate situated on the front side being removed.

Figure 12a shows a view of the calendar taken from the rear of Figure 12, with the rear cover plate removed.

Figure 13 is a plan view of the same embodiment.

Figure 14 shows the calendar mechanism situated behind the calendar plates and Figure 15 is a horizontal section taken on line 15, 15 in Figure 14.

Figure 16 shows the backside of the calendar.

Figure 17 shows a further embodiment of the mechanism employed for the displacement of the month plate and for the restoring of the date plate.

Figures 17a and 17b show details of the last-mentioned mechanism.

Figure 18 is a section through the line 18, 18 in Figure 17.

Figures 19 to 24 show an improved driving mechanism for the calendar, said mechanism being controlled by a clockwork.

Figure 19 is a front view of portions of said controlled driving mechanism.

Figure 20 shows a brake and stopping arrangement for the driving mechanism shown in Figure 19.

Figure 21 is a partial plan view of the driving mechanism and the stopping arrangement shown in Figures 19 and 20, respectively.

Figure 22 shows how the driving mechanism is connected to the driving spring of the clockwork.

Figure 23 is a vertical section through the line 23, 23 in Figures 19, 20 and 22.

Figure 24 is a side view of the members shown in Figure 21.

Figure 25 shows another embodiment of a driving mechanism controlled by a clockwork.

Figure 26 is a horizontal section through the line 26, 26 in Figure 25.

Figure 27 is a vertical section through the line 27, 27 in Figure 25.

Figure 28 is a section through the line 28, 28 in Figure 25, the 24-hour-hand being replaced by a rotatable disc.

Figure 29 shows on a reduced scale the last-mentioned disc.

Figure 30 shows, likewise on a reduced scale, a modified embodiment of said disc as well as a displacement arrangement intended for the same.

Figure 31 is a plan view of the members shown in Figure 30.

In Figures 1 to 11, a calendar 11 is arranged to be driven from a clock 1, Figure 1, by means of a transmission gear consisting of a cog-wheel 2 secured to the shaft of the hour-hand and meshing with a cog-wheel 3 having twice as many cogs. The bigger cog-wheel 3, which makes one revolution in twenty-four hours, actuates by means of a heliciform eccentric 4, Figures 6 and 7, a spring-loaded rod 5, the upper end of which is provided with a slot 6 and a pin 7 which is attached above this slot and rests against the eccentric 4. A guide pin 8, which engages the slot 6, is centrally inserted in the axle spindle of the cog-wheel 3. The rod 5 which is connected to a downwards acting draw spring 10, is at its lower end by means of a bolt 31, Figure 3, connected to a driving arm 30 of the mechanical calendar 11, to which arm on the rotation of the cog-wheel 3 in a counterclockwise direction thus is imparted a lift and drop motion.

For the purpose of setting the calendar without actuating the clock, the cog-wheel 3 is not rigidly secured to the eccentric but provided with a catch-spring 9, which engages a notch on a disc 13, said disc being formed on the axle spindle of the cog-wheel, to which spindle the eccentric is attached. Said spindle is, moreover, provided with a wheel 13' by means of which the eccentric 4 may thus be rotated independently of the cog-wheel 3.

The calendarwork is in conformity with ordinary clockworks mounted between two plates. The one of said plates that is situated on the front side, is provided with a suitably formed window 14 which frames the plate markings necessary for the reading of the calendar.

In Figures 2 and 3, the rear mounting plate of the calendar is denoted 15, into which plate is threaded a centre-pin 16. The calendar is provided with four ring-shaped plates indicating the single days of the week, date, month and year, and the three last-mentioned of which are directly journalled on the pin 16.

The year plate consists of a toothed disc 20 which is provided with twelve ratchet teeth and twelve number groups corresponding to said ratchet teeth and consisting of the last two numbers of consecutive years. To the back side of the year plate is welded a cam disc 29, Figure 4, provided with three cams and twelve evenly distributed notches, every fourth notch being located on one of the three cams of the disc.

The month plate 19 is divided into twelve fields of equal size, each of which is marked with a month-name. The month-names are disposed in chronological order. Said month plate is carried by a disc 22 which is formed as an escapement wheel having twelve escapement or month pins $M_1$—$M_{12}$ which are situated at radial distances corresponding to the different number of days of the months. The radial distance of the pin $M_1$ corresponds to the number of days of the month of January, $M_2$ to that of the month of February, etc. The pins $M_1$, $M_3$, $M_5$, $M_7$, $M_8$, $M_{10}$, and $M_{12}$ are thus situated on one and the same circle and the pins $M_4$, $M_6$, $M_9$, and $M_{11}$ on another circle having a somewhat shorter radius. The pin $M_2$ is movable, so that it can be set into two positions corresponding to 28 and 29 days. The pins $M_1$, $M_3$—$M_{12}$ are at the same time arranged to support the month plate 19 in such a manner that an intervening space is formed between the month plate 19 and the month disc 22, in which space an arm 24 can reach the month pins.

The date plate consists of an annular raised portion 18 on a disc 21. Said date plate is divided into thirty-two fields of equal size which are marked with the ordinal numbers 1 to 31 in succession in such a manner that each field contains an ordinal number, except the field between the numbers 1 and 31, which field has no marking. The annular portion 18 is in radial direction outwards and inwards bordered by concentric cylindrical surfaces, of which the inner surface encircles the month disc 22. The rear side of the disc 21 is around its centre formed as a spring casing 32 enclosing a spiral spring 28, which casing holds the outer end of said spring, whereas the inner end of the spring, by means of a hook or the like, is secured to the centre-pin 16. The periphery of the date disc is divided into 32 ratchet teeth, thus one tooth for each date field.

The day plate is formed as a flanged ring 17, which with its flange is slidably mounted round the outer cylindrical surface of the annular portion 18 of the date disc 21, the flange of the ring being directed towards the date disc so that an intervening space is formed between the day ring and the peripheral portion of the date disc. The day plate is divided into seven fields of equal size which are marked with the names of the days of the week in succession. The day ring is at its periphery provided with seven ratchet teeth corresponding to the day fields, which teeth extend in radial direction a distance beyond the teeth of the date disc, whereas the bottom of the tooth gaps in both cases is located at the same distance from the common centre of the plates.

The centre-pin 16 is by means of a screw attached to one end of a strut arm 41, the other end of which is secured by screws to a pin 42 inserted in the mounting plate 15. The strut arm holds the locking device of the year plate, which device will be described in connection with the function of the year plate.

Likewise, the structure and function of the arm shown at the bottom of Figure 2 and denoted 24, will be elucidated in the description of the function of the month plate.

The driving arm 30 of the calendar, which arm is provided with a pawl 33, is shown in Figure 2 in its lowest position, i. e. the position that the arm takes up after a completed displacement of the day and date plates. The arm is continuously moved upwards from said position into its uppermost position in the course of 24 hours, by means of the eccentric 4, Figure 6.

In Figures 8 and 9, the driving arm 30 is shown in its uppermost position, the day ring 17 being marked by means of dash-dotted lines. The spring casing 32 forms a bearing for the arm 30, said bearing being concentrical with the centre-pin 16. The pawl 33 is by means of a spring 34 kept in engagement with the day ring 17 as well as with the date disc 21. The bolt 31 secured to the driving arm 30 moves during the lift and drop motion of the driving arm in a slot 27 provided in the plate 15. Furthest to the right on the plate 15 a guiding strip 25 is arranged to be retained by means of pins 26. The guiding strip 25 is inwards bordered by a cylindrical surface 37, the geometrical axis of which coincides with the centre of rotation of the driving arm 30. The radius of the cylindrical surface 37 is so chosen that the guiding strip 25 will actuate a guide shoulder 35 formed on the pawl 33 so that the pawl 33 is raised clear of the date disc but is kept in engagement with the teeth of the day ring when the guide shoulder 35 is held against the cylindrical surface 37. It is shown by the figure that the pawl 33 from its uppermost position can be moved downwards a certain distance corresponding to the tooth pitch of the date disc, before the guide shoulder 35 of the pawl comes into engagement with the cylindrical surface of the guiding strip 25. During the downward motion of the driving arm the date disc is thus fed one tooth or, in other words, one date number, whereupon the pawl 33 is in engagement only with the day ring, which is fed one tooth pitch or one day by the pawl. When the day ring has been fed one step, the driving arm has reached its lowest position.

In a view to retaining the day and date plates in the positions into which they have been set, each of them is locked by means of a spring-loaded stop pawl 50 and 53 respectively. The two pawls 50, 53 are pivoted on a bolt 51 and are kept in engagement with the teeth of the day and date plates by means of springs 52 and 54 respectively. The springs 52 and 54 may suitably be made in one piece and be retained by a pin 55 inserted in the plate 15.

Figures 10 and 11 illustrate the members which are provided for the displacement of the month plate and the restoring of the date plate.

The arm 24 which is fulcrumed at a pin 23 is pressed inwards towards the centre of the calendar by means of a spring 65. A pin 67 on the arm 24 takes up the pressure of the spring 65.

The arm 24 is at its free end provided with a claw-like portion which is provided partly with a notch 60 and partly with four notches $D_{31}$—$D_{28}$ disposed in steps. The clawlike portion of the arm 24 is dimensioned in such a manner that a striker tappet 12 inserted in the annular portion 18 of the date disc engages the notch $D_{31}$ when the notch 60 seizes the ones of the pins $M_1$—$M_{12}$ which correspond with months having thirty-one days. If, on the other hand, the calendar shows a month consisting of 30 days, for instance the month of November, the pin $M_{11}$ is in engagement with the notch 60, the arm 24 then taking up such a position that the tappet 12 engages the notch $D_{30}$. Finally, the February pin $M_2$, which according to the foregoing can take up two different positions, sets the arm 24 in such a manner that either the notch $D_{28}$ or $D_{29}$ is brought into the path of the tappet 12 of the date disc. The last-mentioned case occurs when the year plate shows leap-years. The bearing pin 23 of the arm 24 is inserted in a plate member 66 journalled on the centre-pin 16, the peripheric edge portion of said plate member being provided with a flange 69. This flange is arranged to raise the pawl 53 clear of the teeth of the date disc on the rotation of the plate member 66 in a clockwise direction. The central portion of the plate member 66, which portion forms a cover for the spring casing provided at the date disc, is formed with an eccentric 68, which rests against the free end of an S-formed spring 70. The other end of said spring is by means of a pin 71 attached to the plate 15. In the position shown in Figure 10 the spring 70 presses the plate member 66 against a stop pin 72 which is inserted in the rear mounting plate 15. The plate member 66 can be turned in a clockwise direction, the spring 70 then being pushed over the top of the eccentric 68 and the eccentric together with the arms 66, 24 being moved, by means of the spring 70, into the position marked in Figure 10 with dash-dotted lines. During this rotary motion the arm 24 goes out of engagement with the one of the pins $M_1$—$M_{12}$ which corresponds to the month as set, butts against the next month pin and slips against said pin until the notch 60 comes into engagement with the pin in question, the flange 69 thereby pushing the pawl 53 outwards such a distance that it goes out of engagement with the date disc.

In consequence, when the pawl 33 takes up its lowest position on a change of month, the date disc is thoroughly unblocked and is swung in a counterclockwise direction by the spiral spring 28. The tappet 12 thereby thrusts against a projection 58 on the clawlike portion of the arm 24 and brings said portion together with the system 24, 66, 68 back to the initial position. Since the notch 60 is now in engagement with one of the month pins $M_1$—$M_{12}$, the month plate is simultaneously turned forward into a position corresponding to a new month. In this position the month plate is retained by means of the arm 24, which is now in its turn kept in locked position through the members 70, 68, 66, and 72. The tappet 12 rests, under the action of the spiral spring 28, against the projection 58, which is so dimensioned that the distance of the pin 12 from the notch $D_{31}$ corresponds to the width of two date fields. This is obvious from Figure 2. The day plate is marked with numbers in such a way that the ordinal number 1 is visible in the window 14 of the calendar when the pin 12 rests against the projection 58. The day plate is, therefore, restored every time the month plate is displaced so as to indicate a new month.

On the displacement of the month plate from the December position to the January position also the year plate is displaced.

In Figures 4 and 5, the year plate 20 is normally locked by means of a pin 40 on a two-armed pawl 39. Said pawl is pivoted on a screw 43 threaded into the strut arm 41. A spring 48, which rests against a pin 38 on the other arm of the pawl, endeavours to turn the pawl in a counterclockwise direction. A shoulder 59 on the month plate is so arranged that it comes into engagement with the pin 38 on the displacement of the month plate from the December position to the January position and pushes said pin in the direction of the centre of the calendar, by means of which the pin 40 is moved clear of the teeth of the year plate. In this connection it may be pointed out that, in a view to a firmer locking of the month plate, the pin 38 can cooperate with twelve notches (not shown) disposed in a suitable manner at the inner edge of the plate.

Figures 4 and 5 also illustrate the special arrangement of the adjustable February pin $M_2$. A cursor 46, which is disposed in the month plate and is slidable therein in radial direction, is provided with two pins 45, $M_2$, of which the pin 45 cooperates with notches in the cam disc 29 of the year plate. The cursor 46, which is disposed in a slot 47 in the month plate, is located between the cam disc 29 and the date disc 21, whereby it is guided longitudinally. A spring 44 attached to the month plate keeps the pin 45 in engagement with the notches of the cam disc 29. By this means a catch action is obtained between the year and the month plate. Thus, the February pin M₂ follows the curve of the cam disc 29 on the turning of the month plate in relation to the year plate. The cam disc is so shaped that the pin M₂ takes up two in radial direction determined positions which correspond to months of 28 and 29 days. The last-mentioned case occurs when the pin 45 rests against one of the three cams of the cam disc. On account of the relative motion between the year and date plates, it occurs only every fourth year that the pin M₂ in its outer position, leap-year position, is in engagement with the notch 60 of the arm 24.

The embodiment of the calendar hereinbefore described functions in the following manner.

The driving impulse released by the clockwork pushes the driving arm 30 from its uppermost to its lowest position, the day and date plates then being fed one step or one tooth pitch each. The tappet 12 of the date disc is during the first day of the month in the initial position shown in Figure 2. When the date disc has been fed the number of days corresponding to the indicated month, the tappet 12 has arrived at one of the notches D₃₁—D₂₈ on the arm 24. The position, shown in Figure 10, of the members of the calendar represents the position on the 30th of January. As appears, the tappet 12 is positioned one step to the right of its last position in this month. The arm 24 is in engagement with the month pin M₁ and thus occupies such a position that the date disc can be fed another step so that the date number 31 becomes visible in the window of the calendar. At 12 o'clock at the night before the 31st of January the driving arm 30 is again pushed downwards into its lowest position conveying the date disc one step, the tappet 12 then arriving at the notch D₃₁ whilst feeding simultaneously the day plate. At the next impulse on the driving arm 30 the tappet 12 pushes the arm 24 in a clockwise direction so that the spring 70 snaps over the top of the eccentric 68, the arm system 24, 66, 68 being thereby rapidly carried forward in a clockwise direction into the position in which the notch 60 engages the next month pin M₂. During the rotation of the disc 66 in a clockwise direction, the pawl 53 is raised so as to get clear of the teeth of the date disc. In the meantime, also the pawl 33 of the driving arm has, by engagement with the guiding strip 25, gone out of engagement with the teeth of the date plate, on account of which the date disc, which is now free, is brought, by means of the spiral spring 28, to make one revolution in a counter-clockwise direction. The tappet 12 now rests against the projection 58 of the clawlike portion of the arm 24 and returns the arm system 24, 66, 68 to the initial position, which is determined by the stop pin 72, and simultaneously the month plate is fed to a new month. The month plate having arrived at the December position, the shoulder 59, which is shown in Figure 4, occupies such a position that, on the next advancing of the month plate, it passes below the pin 38 of the two-armed lever 39, the year plate being thereby made free from the detent pin 40. By means of the snap connection between the year and month plates, the year plate is now fed simultaneously with the month plate and is set to a new year.

The leap-year position of the cam disc 29 connected to the year plate is shown by Figure 2. The calendar indicates here Friday, the 1st of January 1932. The pin 12 of the date plate is in the initial position. The driving arm 30 occupies its lowest position, which indicates that a displacement of the day and date plates has recently been performed. The month pin M₂ is one step to the left of the notch 60 on the arm 24 and one step to the left of one of the cams of the cam disc 29. On the next month displacement, the pin 45 of the cursor 46 is brought up on to said cam and the pin M₂ sets the arm 24 into the position in which the notch D₂₉ is moved into the path of the tappet 12. The feeding of the date plate can, therefore, continue only up to the date number 29, because during the displacement from the 29th to the 30th the feeding mechanism of the month plate is released and the date plate is restored.

A second embodiment of the mechanical calendar is shown in Figures 12 to 16, said embodiment differing from the one above described in the main by a modified structure of the mechanism adapted for feeding the month plate and of the restoring mechanism of the date plate.

The calendar according to this embodiment presents, for the rest, great likenesses with the first embodiment and thus comprises four plates which are fed step by step and are subdivided in the same manner as the plates hereinbefore described, with the distinction, however, that the date plate only comprises thirty-one fields of equal size and numbered in succession.

In Figures 12 and 13, 17' and 18' designate the day and the date plate which are disposed and fed in the same way as in the embodiment above described. Two springs 96 and 96' adapted as catch springs retain said plates in the positions into which they have been set. The month plate 19' is turned in a counterclockwise direction, whereas the year plate 20' likewise provided with the twelve year fields is fed in a clockwise direction.

The guide shoulder 35 of the pawl 33 co-operates also here with the cylindrical surface 37 on a fixed guiding strip 25' on the displacement of the day and the date plate. The pawl 33 is pivoted on a projecting bracket 156 which in its turn is supported by a pin 155 extending through an arc like slot 27' coaxial with the calendar shaft 61, said pin being welded to a driving arm 56 of the calendar. 125 designates an adjustable guiding strip which is arranged in such a manner that it in its operative position forms an extension of the strip 25', the pawl 33 being by this means during the whole feeding stroke kept out of engagement with the toothed rim of the date plate. The guiding strip 125 is carried by a substantially vertical rod 124, which by means of slotted holes grasps two guide screws 142 threaded into the strip 25'. By means of this arrangement, the purpose of which will be stated in the following, the strip 125 can be set into a lower or operative position and into an upper, inoperative position. The rod 124 which at its lower end is provided with a foot 126 is of such a length that on the erection of the calendar on a plane supporting table the guiding strip 125 will be displaced upwards into the inoperative position, i. e. so as to get clear of the pawl 33 on the ground that the foot of the rod will then bear on the same plane as the calendar.

In Figure 14, the calendar mechanism is shown after the plates of the calendar have been removed. The section in Figure 15 comprises, on the other hand, also the plates in their mounted position.

In Figure 15, the year plate is denoted 20' and the month plate 19'. The centre-shaft 61 of the calendar is rigidly secured to the year plate, a cam disc 29' and a tooth wheel 100, which is provided with twelve teeth. The month plate 19' constitutes an annular raised portion on a disc 22' situated behind the year plate, said disc being rigidly secured to a sleeve 32' revolving on the shaft 61. The rear end of said sleeve is in its turn rigidly secured to a disc 22b, the peripheric portion of which forms a ring-shaped body which inwards towards the centre-shaft is bordered by a cylindrical surface 57', which is concentrical with said shaft, and outwards by a cam surface 57, by the side of which the ring-shaped body is provided with a ratchet drum 62 having twelve detents.

The date plate is carried by a disc 21' which is rigidly secured to a heliciform eccentric 49 and a socket, which is rotatively mounted on the shaft sleeve 32'. The disc 21' is at its periphery provided with a tooth rim segment 95 which takes up an angle corresponding to four date fields. The day plate is, as stated in connection with the first embodiment, formed as a rim 17', the day ring, which is rotatively mounted on a cylindrical surface bordering the date plate outwards, that edge of said cylindrical surface that is turned forwards, being pressed out to form a very thin flange ring, which retains the day ring in position and forms an effective guide for the same. The calendar plates are, as appears from Figure 15, all together arranged in a common plane.

The pivotlike rear end of the shaft 61 extends through the rear mounting plate 15' of the calendar and forms a bearing spindle for the driving arm 56 of the calendar. The outermost end of said spindle is rigidly secured to a ratchet wheel 140.

The members provided for feeding the month and the year plate and for restoring the date plate are shown in Figure 14.

A feed arm 63 actuated by a spring 89 and intended to displace the month plate is rotatively mounted on a bolt 26' inserted in the rear mounting plate 15'. Said arm is at its free end provided with a pawl 81, which by means of a spring 82 is kept in engagement with the toothed rim 62 of the disc 22b, which rim is normally locked by a catch spring 149. The last-mentioned spring 149 is secured to a pin 149'. The driving spring 89 effecting the feed motion is at its one end by means of a pin or the like 92 attached to the plate 15' and at its other end connected to a toothed rack 83 secured to the free end of the feed arm, said rack being laterally guided by a guide shoulder 83'. A cursor 64 is slidably arranged on the arm 63. For the purpose of guiding the cursor a bolt 79 attached to the arm 63 is arranged to engage a guide slot 121 on the upper end of the cursor. The cursor carries at its lower end two bolts 77 and 78, of which the bolt 78 is arranged to run in a guide slot 122 in the arm 63. The guide slots 121 and 122 are of the same length and are in alignment with one another. A spring 91 is inserted under tension between the upper end of the arm 63 and the upper portion of the cursor 64. Said spring endeavours to move the cursor towards the upper end of the arm 63. The mid-portion of the cursor is provided with a curve follower 80 projecting to the side, which follower is arranged to rest against the heliciform eccentric 49 of the date plate. By the rotation of the date plate in a clockwise direction the arm 63 is endowed with a slow upward motion, until the follower 80 has reached that portion of the eccentric that is located furthest away from the centre, said portion being limited by an arc coaxial with the centre-shaft 61. Said arc occupies a position corresponding with the four date fields "28", "29", "30", and "31", and also its length corresponds with said fields. When the follower 80 has passed top portion arc of the eccentric, the arm 63 is disengaged and quickly swung downwards by the spring 89 whilst feeding the month plate one step. For the purpose of obtaining a positive locking of the month plate in the intended positions, the arm is provided with a finlike portion 143 carrying a detent pin 144, which is so arranged that after a completed displacement of the month plate it rests in a tooth gap on the toothed rim 62. The follower 80 then rests against that portion of the eccentric that is nearest the centre.

In practice it has, however, turned out to involve a disadvantage that the eccentric 49 raises the feed arm 63 through the intermediary of the follower 80 secured to the cursor 64. In order to overcome this disadvantage the arm 63 is, according to the invention, provided with a carrying pin 150 which is arranged to rest against the eccentric 49 during the lift motion of the eccentric, the carrying pin being mounted at the same radial distance from the centre of rotation of the eccentric as the follower 80 provided on the cursor 64 but in such a manner that the carrying pin is in advance of the follower, counted in the direction of rotation of the eccentric. Through this arrangement of the carrying pin the follower goes into engagement with the eccentric only when the lift motion has stopped, whereupon the top portion arc of the eccentric will slide against the follower 80 during those feeding steps of the date indicating member that correspond to the last four days of the month, by means of which the displacement of the month indicating member and the restoring of the date plate are effected in dependence of the position of the follower 80 in relation to the arm 63.

The above mentioned cursor 64 is at its lower end slidably connected to a setting arm 73 on the ground that the bolt 77 is arranged to engage a guide slot 76 on the last-mentioned arm, which is rotatively mounted on a pin 75 inserted in the arm mounting plate 15'. The mid-portion of the arm carries a roller 74, which is arranged to roll on the cam surface 57 provided on the disc 22b. This cam surface follows in the main the curve which is obtained if the month pins $M_3$—$M_{12}$ and $M_1$ in the first embodiment of the calendar are connected by means of a continuous curve line. The cams are thus situated at radial distances from the shaft 61 corresponding to 30 and 31 days, and the arm 73 as well as the cursor 64 are set by means of said cam surface into positions corresponding to 30 and 31 days. A piece corresponding to the "cam" of the month of February is, however, cut away from the annular raised portion on the disc 22b. Consequently, the roller 74 will rest against the cam disc 29' disposed in approximately the same vertical plane, when the disc 22b and, accordingly, also the month plate occupies its February position. Said position is shown in Figure 14. The cam disc 29' is shaped in the same manner as the cam disc 29 in the first described embodiment and thus provided with three cams, the top portions of which lie at a radial distance from the centre-shaft 61 corresponding to 29 days, whereas the periphery of the cam disc, said periphery being limited by a circle, has a radius corresponding to 28 days according to the scale indicated above for the cam surface 57. According to the position of the cam disc 29', the arm 73 and the cursor 64 are thus set into a position that corresponds to 28 or 29 days.

According to the foregoing the cursor 64 occupies during the displacements of the month plate and the year plate four different positions, in relation to the arm 63, corresponding to months having 28 to 31 days. In the position, shown in Figure 14, of the cursor the follower 80 bears on the top of the eccentric 49 when the date plate has been fed 28 steps from its initial position, i. e. when the date number 28 is visible in a window provided in the front mounting plate of the calendar, which window may be arranged in accordance with the one shown in Figure 1. The lowest position of the cursor corresponds with thirty-one feeding steps of the date plate.

During the displacement of the month plate the date plate is restored into the initial position which is brought about by means of an arrangement that will now be described with reference to Figure 14.

The toothed rack 83 provided at the upper end of the feed arm 63 is arranged to cooperate with two cog-wheels 86, 87 which are concentrically journalled and rigidly secured to each other, the toothed rack being arranged to mesh with the smaller cog-wheel 87. The bigger cog-wheel 86 is arranged to mesh with the tooth rim segment 95, which is welded to the date plate 21' and arranged coaxially with said plate 21' and dimensioned in such a manner that the date plate by means of the rack 83 and the cog-wheels 86, 87, on the swing motion of the arm 63 downwards, is rotated an angle corresponding to four date groups. In order to prevent the cog-wheel 86 from engaging the segment 95 every time said segment passes said cog-wheel, the teeth of the cog-wheel are cut away along one third of the circumference of the wheel. While the date plate indicates the numbers 28 to 31, the arm 63 and, consequently, also the toothed rack as well as the cog-wheels 86, 87 are at rest. During this time the wheel 86 occupies a position, shown in Figure 14, in which the segmental rack can freely pass the last-mentioned wheel.

However, as the restoring of the date plate takes place relatively quickly, there is the risk that the date plate is swung past the initial position so that it will occupy an undesired position. In order to prevent such a faulty position a segmental plate 147 is placed on the cog-wheel 86 cooperating with the segmental rack 95 of the date plate, said plate 147 being arranged to engage, under free motion, a groove 148 turned in the date plate and being concentrical with the same. The thickness and diameter of the plate 147 are equal to the depth and width, respectively, of the groove the plate 147 thereby filling up thoroughly the sectional area of the groove when the edge, limited by the chord of the plate is placed approximately perpendicularly to the walls of the groove. If the plate is rotated in such a manner that said edge is parallel to the groove wall, a detent pin secured to the groove wall can freely pass by, said pin being so placed that the month plate indicates the number 1 when the detent pin butts against the plate 147. The gearing 83, 86, 87, 95 is of such a nature that said plate only in that moment when the date plate has reached the initial position, obstructs the passage of the detent pin, whereupon the cog-wheel 86 by the toothed rack 83 is turned further into a not locking position in which it stays, until the detent pin has passed the cog-wheel 86 on the next feeding step of the date plate.

The displacement of the year plate is effected by means of a gearing. In Figures 14 and 15, the tooth wheel 100 rigidly secured to the year plate is shown in tooth engagement with a tooth wheel 90 journalled in the mounting plate 15'. The last-mentioned wheel is turned one tooth pitch every time the month plate and, accordingly, the disc 22b have completed one revolution. This is accomplished by means of a pin 99 inserted in the disc 22b, which pin on the displacement of the year disc engages the tooth wheel 90. The year disc is locked in the intended positions by means of a catch spring 98.

The function of the calendar shown in Figures 12 to 15 will be more closely described in the following:

According to Figure 12, the calendar indicates Saturday, the 28th of February 1931. The feed arm 63 is in its uppermost position and, therefore, the displacement of the month plate is approaching. At the next displacement of the date plate by means of the pawl 33 the eccentric 49 slides out of the way of the curve follower 80, the arm 63 then being swung downwards by the spring 89. By this the month plate is displaced one step and thus indicates "March". However, as the month of February only contains 28 days in an ordinary year, the date disc is to be turned forward during the displacement of the month disc so far that it indicates the date number 1. This restoring of the date disc is effected by means of the toothed rack 83. The tooth rim segment 95 always occupies when the date plate indicates the ordinal number 28, the position shown in Figure 12. On the rotation of the cog-wheel 86 (Figure 14) in a counterclockwise direction during the downward motion of the toothed rack, the cogs of the wheel mesh with the cogs on the segment 95 that is turned in a clockwise direction. On account of the adjusted length of the segment, the date plate is brought to its initial position, in which it indicates the ordinal number 1. The year disc occupies a position corresponding to an ordinary year, thus not a leap-year. The roller 74 in this case rests against the circular edge of the cam disc 29'. One twelfth revolution to the right of the roller is to be seen one of the three cams of said cam disc. On the displacement of the month disc from the December position to the January position, the tooth wheel 90 is actuated by the pin 99, the year plate then being turned one step in a clockwise direction. By this means the roller 74 will in the next month of February rest against a cam on the cam disc 29', which in its turn influences the position of the cursor 64 on the arm 63. The follower 80 then occupies in relation to the arm 63 a position corresponding to a month of 29 days. During the feeding of the month plate from the February position to the March position the roller 74 is raised up on to that cam on the disc 22b that corresponds to the month of March, by means of which the arm 73, the cursor 64 as well as the follower 80 take up a position corresponding to a month of 31 days.

The embodiment, as last described, of the mechanical calendar is arranged to be driven either by hand or automatically under the control of a clockwork. In the first case a tangent arm is employed, which is rigidly secured to the driving arm 56 of the calendar. The tangent arm may naturally be made as an extension of the arm 56.

In the present case the tangent arm 30' (Figure 16) is integral with the driving arm and arranged in such a manner that it is accessible on the under side of the calendar. This placing of the tangent arm is chosen in order to prevent undue displacement of the calendar.

In order to make it possible, in such cases when the calendar for some reason or other has not been employed for a prolonged period, to set the calendar plates again in a proper manner, the calendar plates have been combined with particular setting arrangements manageable by hand, which will now be described with reference to Figures 14 to 16.

By using the adjustable guiding strip 125 above described one can by means of the tangent arm 30' displace either the day and date plates simultaneously or the day plate alone into the desired positions. This latter alternative is attained by moving down the foot 126 on the rod 124 so that the guiding strip 125 will occupy its operative position.

According to the invention, for the displacement of the month plate the following arrangement is employed. A tangent arm 127 journalled on a pin 130 in the mounting plate 15' of the calender is crumped at its free end and conducted through an arc-formed slot 128. Near the outer end of the arm a slightly bent flat spring 146 is secured, which acts as a ratchet pawl for the toothed rim 62 of the date indicating member. On swinging the tangent arm 127 in a counterclockwise direction against the action of its spring 131, the tooth wheel 62 is turned, the slot 128 being of such a length that the tooth wheel is thereby fed one step. The journalled end of the arm 127 is provided with an eccentric 129 which is arranged to go into engagement with a pin 145 secured to the toothed rack 83, on the feeding motion of the arm. As appears from Figure 14, the toothed rack is thereby displaced upwards, by means of which the detent pin 144 of the feed arm 63 goes out of engagement with the ratchet wheel 62 which is by this means only retained by the catch spring 149. The ratchet wheel 62 together with the month plate rigidly secured thereto can thus by means of the tangent arm 127 be displaced into a desired position, the direction of rotation of the month plate then being the same as at the automatic feeding.

For independent displacement of the year plate a ratchet arrangement 133 to 140 shown in Figure 16 is employed. 133 designates a displacement arm, loaded by a spring 138, rotatively supported on the end of the shaft 61 of the calendar. A pawl 135 actuated by a spring 137 is provided with a tail portion 136 which, when the arm 133 rests against a stop pin 132, goes into engagement with a fixed shoulder 139, the pawls 135 being thereby brought out of engagement with the ratchet wheel 140 secured to the shaft 61. As also the year plate is rigidly secured to the shaft 61, it can by means of the above-mentioned ratchet be displaced by hand, the year plate then being turned in a direction opposite to its feed direction, during the automatic displacement, which in practice has been found to be particularly suitable. On this account, it is necessary that the pawl 135 in the resting position of the arm 133 is out of engagement with the ratchet wheel 140.

In order to impart a smoother run to the calendar members operative on a change of month the invention also aims at a brake apparatus which on the month displacement influences the motion of displacement of the month plate as well as the restoring motion of the date plate. Said brake apparatus will be described with reference to Figures 17 and 18 in conjunction with a simplified, yet in combination with the brake apparatus thoroughly effective arrangement for locking the month plate in due positions after each displacement step.

Said locking is obtained by that means that the free end of the pawl 81 is provided with a notch 242 that is arranged to engage a stop pin 241 which is rigidly mounted on the mounting plate 15' of the calendar. The notch 242 has such a form that the pawl in the final position, marked in Figure 17 by means of dash-dotted lines, after completed feeding cannot be swung in a radial direction outwards from the toothed rim 62, the last-mentioned rim as well as the months indicating member being thereby prevented from swinging past due positions.

As described in connection with Figures 14 and 15, the pawl is displaced under continuous motion from its final position back to the initial position in the course of approximately 25 days and the toothed rim 62 is, therefore, kept in locked position at least 24 to 48 hours, counted from the point of the displacement. In order to make it possible, in spite of the temporary locking, to displace the date indicating member by hand whenever wanted the special readjusting tangent 127 which is pivoted on the pin 130 and actuated by the draw spring 131 may still be used. The free end of the tangent carries, however, in this case a pivoted feed finger 243 actuated by a spring 244, which finger after the swing of the tangent 127 a small angle against the action of the spring 131 goes into engagement with the toothed rim 62 which on a complete tangent deflection is displaced one step, i. e. the month plate is moved forward one month. The eccentric 129 on the end of the tangent still cooperates with the pin 145 provided on the toothed rack 83. The eccentric 129 is so arranged that at the moment when the tangent finger 243 comes into contact with the rim 62, it has raised the toothed rack upwards such a distance that the pawl 81 has been brought out of contact with the pin 241 and been drawn up out of the tooth gap in question, the locking of the toothed rim 62 having thereby ceased.

The teeth on the under edge of the rack 83 cooperate, as stated above, with a restoring mechanism actuating the date indicating member. According to the invention the rack 83 is, however, provided with cogs also on the upper edge, which cogs mesh with a toothed rim provided on a rotatable spring casing 230. The spring casing 230 encloses a spiral spring 240, the outer end of which is rigidly secured to the spring casing, whereas the inner end of the spring is fixed to a shaft 237 carrying the spring casing. The last-mentioned shaft which is rotatively mounted on the two mounting plates 15, 15' of the calendar, is at the end passing through the rear plate 15' formed with a square pin, to which a ratchet wheel 238 is secured (Figures 17a and 17b). The shaft 237 can thus be rotated against the action of the spring 240 and is locked in the position into which it has been set, by means of a lock pawl 239 journalled in the mounting plate 15' and designed in the usual manner. The spiral spring 240 is so arranged that it is tensioned on the displacement of the feed arm 63 and the toothed rack 83 from the final position of said members upwards to the initial position during the rotation of the spring casing 230. On the next release of the feed arm 63 the spiral spring 240 is capable of pulling the toothed rack 83 downwards the distance necessary for the displacement of the months indicating member. However, in order to cause said displacement motion to take place without throbs or thrusts the toothed rim of the spring casing 230 is by means of gears 231 to 235 (Figures 17 and 17a) connected to a fan 236 which in previously known manner reduces the displacement motion to a suitable speed. The above-mentioned locking arrangement 238, 239 for the shaft 237 thereby enables the spiral spring 240 of being set to a suitable initial tension, if so required.

It is important that the run of the clock is not influenced by the driving means necessary for the drive of the calendar and controlled by the clockwork. The above described driving means, shown in Figures 1, 6 and 7, can suitably be employed in connection with calendars of a smaller size and clockworks, the run of which is controlled by a pendulum. In the following, a driving means capable of being used under all circumstances will be described with reference to Figures 19 to 24, which driving means does not in any way unfavourably influence the run of the clock, though the motive power is taken from the spring which drives the clockwork.

In Figure 19, 176 designates a cog-wheel rigidly mounted on the shaft of the hour-hand 177 and arranged to cooperate with a cog-wheel 175 having twice as many cogs. The cog-wheel 176 completes one revolution in the course of twelve hours and, consequently, the cog-wheel 175 makes one revolution in the course of 24 hours. In front of and coaxially with the last-mentioned cog-wheel a crank-pin disc 174 is mounted. Its crank-pin 173 forms a bearing point for a connecting rod 170, which is slotted at the lower end so that it forms a fork which grasps the pin 31' provided on the driving arm 56 of the calendar, as shown in Figure 16. A spring 171 is inserted under tension between the pin 31' and a bolt 172 on the connecting rod. By this means the driving arm 56 of the calendar can be moved by hand downwards without dislodging the connecting rod.

In Figure 23, 214 designates the driving spring of the clockwork, said spring being with its innermost end 216 rigidly secured to a shaft 181, whereas the outer end 213 of the spring is fixed in a spring casing 215. Said spring casing forms a box provided with bearing sleeves, said box being rotatively mounted on the shaft 181 and provided with a toothed rim 217 which meshes with a pinion 183, shown in Figure 20, on a shaft 184, which may represent the shaft of the hour-hand. The mounting plates of the clockwork, said plates being designated 178, 179, are held together by bolts 180. An extension 218 of the shaft 181 is by means of a locking device connected to a cog-wheel 220 which in its turn is in driving connection with a cog-wheel 210 secured to a shaft 190 by means of a pin 209. To the axle end 218 a winding key 219 is screwed on. The above-mentioned locking device is mounted between the mounting plate 179 and the cog-wheel 220 and is shown in Figure 22, which represents a section through the outer limiting surface of the mounting plate 179. 221 designates a ratchet wheel keyed to the axle end 218, and 223 designates a stop being under the action of a spring 222. The stop 223 is rotatively mounted on a pin 224 secured to the cog-wheel 220. By means of this arrangement the driving spring of the clock can be tensioned without the wheel 220 then being turned. The crank-pin disc 174 is provided with an annular central portion 206 which acts at the same time as a separating and strengthening ring for the disc 174 which is rigidly secured to the shaft 190, Figure 23. The last-mentioned shaft carries, moreover, a cog-wheel 191 fixed by means of a pin 212, as well as the before-mentioned cog-wheel 175 which is rotatively mounted on the shaft and provided with a plane lamelliform body. 207 and 208 designate washers. The cog-wheel 191 drives a system of cog-wheels 192 to 198 (Figure 20) meshing with one another, which system is arranged to function as a friction brake for the shaft 190. A stop spring 200 which is straight when slack, is at its one end secured to the front mounting plate 178 of the clockwork. The free end of the spring is provided with a stop finger 201, which in locking position engages a tooth on a wheel 202 (Figure 24) welded to the cog-wheel 195. A knob 203 is riveted to the spring near the fixed end thereof. Said knob can move freely in a bore in the mounting plate 178 in such a manner that under the action of the spring 200 it is held against the plane backside of the cog-wheel 175. The last-mentioned cog-wheel possesses a bore which in the position shown in Figure 23 forms an extension of the bore provided in the plate 178, by means of which the knob 203 can penetrate into the disc of the cog-wheel 175 so far, that the spring 200 reaches its slack position, in which the stop finger 201 of the spring goes out of engagement with the detent of the wheel 202. The cog-wheel system 192 to 198 thereby starts, and acts, as already mentioned, as a friction brake for the shaft 190, which is put in rotation by the driving spring 214 of the clockwork.

As, however, the driving arm of the calendar at each feeding stroke has to be swung from its uppermost position to the lowest position and back once in 24 hours, the crank-pin disc has to be locked again when it has made one revolution. For this reason, an axially movable piston 204 fitted into the bore of the cog-wheel 175 is arranged to cooperate partly with the knob 203 of the straight spring 200, and partly with a pin 205 rigidly inserted into the crank-pin disc, as appears from Figure 23. That end of the piston 204 that cooperates with the knob 203, said end being in the following denominated the head, is constructed with a plane butting face and with a greater diameter than the remaining portion of the piston. The other end face of the piston forms a frustum of a cone. The bore in the cog-wheel 175 is formed to receive the piston 204, that portion of the bore which is bored out to a greater diameter being of a length that exceeds the axial dimension of the head to a value corresponding to the displacement of the knob 203 on the retrogression of the spring 200 from locking into inoperative position.

The position, shown in Figure 23, of the members 200, 203, 204, and 205 corresponds to the point of time at which the crank-pin disc has accomplished one feeding revolution, the pin 205 then having pushed the piston 204 in, so that the spring 200 has been moved into locking position. The butting face of the piston head then lies in the same plane as the inner limiting surface of the disc of the cog-wheel 175. It is evident that the knob is kept in locking position when it rests directly against the disc of the cog-wheel 175. The diameter of the head of the piston is greater than the diameter of the knob 203. Thus, the cog-wheel can turn a certain distance, without the knob reaching beyond the face of the piston head. By this the piston slides out of the way of the pin 205, the spring goes out of engagement with the wheel 202, and the driving means starts, the pin then reaching the piston in the new position, pressing it in against the knob and thus locking the driving gear. In dependence of the relation between the dimension of the knob and that of the piston, the crank-pin disc is turned a short distance in one or more steps, after the first locking position after one feeding revolution has been reached. For that reason, the pin 205 is always a certain angle in advance of the knob 203, counted in the direction of rotation of the cog-wheel 175, during the time that elapses between the feeding periods, which is necessary for the function of the driving gear.

Figures 25 and 27 show a modified embodiment of the releasable locking mechanism intended for the driving means. The crank-pin disc 174 is here provided with an eccentric cam or tooth 245 which cooperates with a wing 247 attached to a pivoted arm pawl 246. The crank-pin disc is driven in the manner stated above. A cog-wheel 252 keyed to the shaft 190 of the crank-pin disc is arranged in driving connection with a far 263 across a gear constructed in the usual manner and comprising the cog-wheels 253, 254, 255. As appears from Figure 25 the wheel 254 is arranged to rotate in a counterclockwise direction according to the direction of the arrow.

The arm 246 is journalled on the front side of the front mounting plate 178 of the clockwork on a spindle 248 and is actuated by a draw spring 249 which endeavours to hold the wing 247 against the periphery of the crank-pin disc 174. For this it is convenient to prevent the wing, by means of a stop pin (not shown), from resting under pressure, against the crank-pin disc. The arm 246 is provided with an additional wing 250 forming a cam and disposed in the same vertical plane as the arm itself. The cam surface of said wing cooperates with a pin 251 inserted in the cog-wheel 175. In accordance with the first embodiment, the cog-wheel 175 is in driving connection with the cog-wheel 176 secured to the shaft of the hour-hand 177. The pin 251 thus completes one revolution in 24 hours.

The cog-wheel 254 entering into the air friction gear is provided with two pins 258 and 259, of which the pin 258 is located nearer the centre of the wheel and somewhat in advance of the other pin, counted in the direction of rotation. If the arm 246 occupies the position shown in Figure 25, the pin 258 rests against a stop finger 257 formed at the free end of the arm. Because the arm is mounted in front of the disc 178, and the cog-wheel 254 between the mounting plates of the clock-work, the finger of the arm is carried through a window 260 in the front mounting plate. When the arm by means of the pin 251 and the wing 250 is brought to occupy its uppermost position, the pin 259 impinges on the finger 257. When the pin 251 has passed the wing 250, the arm 246 is moved downwards by the spring 249 so that the wing 247 will anew rest against the top of the tooth 245 while the finger 257 is going out of engagement with the pin 259 and will occupy a position behind the pin 258. Thus, the cog-wheel 254 gets free and is put in rotation. When said cog-wheel has made a complete revolution, the crank-pin disc 174 has, however, turned such an angle that the tooth 245 has passed the surface of support of the wing 247, and, therefore, the arm 246 is lowered a further distance and the finger 257 is brought out of the path of the pin 258. The disc 174 now accomplishes under the action of the driving spring of the clockwork a complete revolution and returns to the position shown in Figure 25, in which position the pin 258 impinges on the finger 257. The motion of the crankpin disc is by means of the connecting rod 170 transmitted to the driving arm 56 of the calendar, which arm then effects the displacement of the day and date indicating members.

The displacement of the calendar suitably ought to take place at midnight and, therefore, the clockwork in case that its plate only comprises twelve hours, ought to be provided with a hand or other indicator by means of which one can settle whether the clock indicates day or night hour. Therefore, the present invention also aims at a similar indicator, which will be described in the following with reference to Figures 25-31.

A first embodiment comprises a hand 271 which across the cog-wheel 176 as well as cog-wheels 265, 266, and 262 is driven by the shaft of the hour-hand 177 under reduction to half the rotational speed of the hour-hand. The hand 271 thus makes one revolution in 24 hours and can be arranged to cooperate with a plate that indicates either day and night or the hour-numbers 1 to 24.

A second embodiment comprises a circular disc 272, which may replace the above-mentioned hand 271. The disc is divided into two halves of different colours indicating day and night respectively, which halves alternately get visible in for instance a window 277 provided in the ordinary clock-face, as appears from Figure 29 which shows the disc in one half full size.

Figure 28 shows in principle the transmission gear that can be employed for the hand 271 as well as for the disc 272. Figure 30 illustrates in one half full size an alternative design of the "day and night disc" designated with 273. Said disc is divided into eight sectors of equal size alternately light and dark. A driving wheel 278 on said disc is provided with eight cogs and is locked by means of a catch spring 279 mounted on a pin 280. The driving wheel 278 is turned one tooth pitch, i. e. ⅛ revolution, every time one of two pins 281 and 281' which are inserted in the cog-wheel 175, passes said driving wheel, light and dark sectors then alternately getting visible in the window 277 so as to indicate day and night, respectively. When the cog-wheel 175, as stated above, makes one revolution in 24 hours, each sector remains visible during a period corresponding approximately to 12 hours. The displacement of the disc 273 requires about one hour. If required, the disc can, however, in a simple manner be arranged for an instantaneous displacement by connecting the disc and the cog-wheel 278 to each other by means of a springy member which is capable of displacing the disc only after a certain tension. The catch spring then is arranged in cooperation with the proper disc.

Without inconvenience, the calendar can be built in in the clockwork and the plates of the calendar can, in this case, be disposed outside or inside the annular portion marked with numbers, of the dial-plate or the plates of the calendar can be disposed concentrically or eccentrically in relation to said portion. The plate rings of the calendar can also be stationary and, in this case, each of the time indicating members fed step by step can be provided with a pointer. It is to be understood that many other changes may be made in the invention without departing from the spirit of the same. For instance, the time indicating members may be disposed in one or more parallel planes or be composed of cylindrical rings, the markings of the plates then being in the last-mentioned case disposed on the outside of the rings, for the purpose of permitting the reading to be performed in the same manner as in a counter or an electric meter.

I claim:—

1. A mechanical calendar comprising in combination coaxially journalled date number, month and year indicating members, primary driving means for setting said date number indicating member, a spring driving device for setting said month indicating member, means operated from said primary driving means for accumulating power in said spring driving device, means controlled by said month and year indicating members for releasing said spring driving device to operate said month indicating member, and means for restoring said date number indicating member to its initial position upon the release of said spring driving device.

2. A mechanical calendar comprising in combination coaxially journalled date number, month and year indicating members, primary driving means for setting said date number indicating member, a spring driving device, means operated from said driving means for accumulating power in said spring driving device, means for operating said month indicating member by said spring driving device, means for restoring said date number indicating member by the action of said spring driving device, and means controlled by said month and year indicating members for releasing said spring driving device to operate said date number and month indicating members.

3. A mechanical calendar comprising in combination coaxially journalled date number, month and year indicating members, primary driving means for setting said date number indicating member, a spring driving device for setting said month indicating member, means operated from said primary driving device for accumulating power in said spring driving device, means for transmitting motion from said spring driving device to said month indicating member, means for restoring said date number indicating member to its initial position, means for transmitting motion from said spring driving device to said date number indicating member, and means controlled by said month and year indicating members for releasing said spring driving device to operate said month indicating member and said restoring means.

4. A mechanical calendar comprising in combination coaxially journalled date number, month and year indicating members, primary driving means for setting said date number indicating member, a spring driving device for setting said month indicating member, means operated from said primary driving device for accumulating power in said spring driving device, said spring driving device comprising a spiral spring the outer end of said spiral spring being keyed to the date number indicating member and the inner end of said spring being keyed to a centre pin, means for restoring said date number indicating member to its initial position, and means controlled by said month and year indicating members for releasing said spring driving device to operate said month indicating member and said restoring means.

5. A mechanical calendar comprising in combination coaxially journalled date number, month and year indicating members, primary driving means for setting said date number indicating member, a spring driving device for setting said month indicating member, means operated from said primary driving device for accumulating power in said spring driving device, said spring driving device comprising a spring loaded pivoted arm for setting said month indicating member and for restoring said date number indicating member to its initial position, means for transmitting motion from said pivoted arm to said date number indicating member, and means controlled by said month and year indicating members for releasing said spring loaded pivoted arm to operate said month indicating member and said restoring means.

6. A mechanical calendar comprising in combination coaxially journalled date number, month and year indicating members, primary driving means for setting said date number indicating member, means for restoring said date number indicating member to its initial position, a spring driving device for setting said month indicating member, means operated from said primary driving device for accumulating power in said spring driving device, said spring driving device comprising a spiral spring, the outer end of said spiral spring being keyed to the date number indicating member and the inner end of said spring being keyed to a centre pin and a pivoted releasing arm controlled by said month and year indicating members for releasing said spring driving device to operate said month indicating member and said restoring means, said pivoted releasing arm being journalled on a revolving disc coaxial with said date number indicating member and normally held in locked position, the peripheric portion of said disc being adapted to unlock said date number indicating member upon revolving said releasing arm.

7. A mechanical calendar comprising in combination coaxially journalled date number, month and year indicating members, primary driving means for setting said date number indicating member, means for restoring said date number indicating member to its initial position, a spring driving device for setting said month indicating member, means operated from said primary driving device for accumulating power in said spring driving device, said spring driving device consisting in a spiral spring, the outer end of said spiral spring being keyed to the date number indicating member and the inner end of said spring being keyed to a centre pin, and a pivoted releasing arm controlled by said month and year indicating members for releasing said spring driving device to operate said month indicating member and said restoring means, said pivoted releasing arm being provided with a clawshaped portion having four notches disposed in steps, said notches forming stoppers for a striker tappet secured to said date number indicating member and said notches being located in such manner that said date number indicating member is indicating the date number 28, 29, 30 or 31 respectively, when said tappet engages the corresponding one of said notches in dependence of the position occupied by said releasing arm.

8. A mechanical calendar comprising in combination coaxially journalled date number, month and year indicating members, primary driving means for setting said date number indicating member, a spring driving device for setting said month indicating member, means operated from said primary driving means for accumulating power in said driving device, a pivoted releasing arm controlled by said month and year indicating members by means of guide pins or guide cams provided on said month and year indicating members, the radial distance of said guide pins or guide cams corresponding to the different numbers of days in the months, said pivoted releasing arm being adapted to release said spring driving device to operate said month indicating member, and means for restoring said date number indicating member to its initial position upon the release of said spring driving device.

9. A mechanical calendar comprising in combination coaxially journalled date number, month and year indicating members, primary driving means for setting said date number indicating member, a spring driving device for setting said month indicating member, means operated from said primary driving device for accumulating power in said spring driving device, said spring driving device comprising a spiral spring, the outer end of said spiral spring being keyed to the date number indicating member and the inner end of said spring being keyed to a centre pin, and a pivoted releasing arm controlled by said month and year indicating members for releasing said spring driving device to operate said month indicating member, said pivoted releasing arm being adapted to be conveyed by said date number indicating member into normal position upon releasing said date number indicating member after movement from said position and forming a stopper for said date number indicating member when restored into its initial position.

10. A mechanical calendar comprising in combination coaxially journalled date number, month and year indicating members, primary driving means for setting said date number indicating member, a spring driving device for setting said month indicating member, means operated from said primary driving means for accumulating power in said spring driving device, means controlled by said month and year indicating members for releasing said spring driving device to operate said month indicating member, said means comprising a cam plate keyed to said year indicating member and a spring loaded cam-follower being slidably mounted on said month indicating member, said cam plate being provided with notches co-operating with said spring loaded cam follower, thereby performing catch connection between said month and year indicating members in order to set said members synchronously at the end of year, and means for restoring said date number indicating member to its initial position upon the release of said spring driving device.

11. A mechanical calendar comprising in combination coaxially journalled date number, month and year indicating members, primary driving means for setting said date number indicating member, a spring driving device for setting said month indicating member, means operated from said primary driving device for accumulating power in said spring driving device, said spring driving device comprising a spring loaded pivoted feeding arm for setting said month indicating member and for restoring said date number indicating member to its initial position, a releasing arm for releasing said pivoted arm at the end of month, said releasing arm being guided by cam plates keyed to said month and year indicating members and being connected to a cursor slidably mounted on said feeding arm, said cursor being provided with a curve follower resting against a quick drop cam keyed to said date indicating member.

12. In a mechanical calendar as claimed in claim 11, said feeding arm for setting said month indicating member and restoring said date number indicating member to its initial position being provided with a carrying pin, said carrying pin being adapted to rest against said quick drop cam during the displacement of said feeding arm from its lowermost to its uppermost position, and having the same radial distance from the centre of quick drop cam as said curve follower.

13. In a mechanical calendar as described, a month indicating member provided with a toothed rim, a spring loaded pawl adapted for independently displacing said month indicating member, said pawl being shaped at its one journalled end into an eccentric cam, said cam in the lowermost position of a feeding arm for the displacement of a month indicating member cooperating with a pin rigidly secured to said feeding arm so as to raise said feeding arm and to bring said detent pin out of engagement with a toothed rim on said months indicating means when the pawl is being actuated.

14. In a mechanical calendar as described, a date number indicating member provided with a toothed segment, a cog-wheel forming part of a toothed gear for restoring the date number indicating member and co-operating with the toothed segment upon said date number indicating member, a segmental plate secured to said cog-wheel and adapted to run in a groove disposed in said date number indicating member and concentrical with the centre shaft of the calendar, said segmental plate being shaped so as thoroughly or partly to fill up the sectional area of said groove depending upon the position of said cog-wheel, said cog-wheel being adapted to stop or to permit a pin inserted in the wall of said groove to pass over said plate depending upon the position of said plate.

15. In a mechanical calendar as described, a month indicating member provided with a toothed rim, a pawl adapted for independent displacement of said month indicating member provided with a notch, a pin to co-operate with the notch in said pawl to check the movement of said pawl upon a completed displacement of said month indicating member so as to prevent said pawl in its locked position from moving in radial direction outwards from said toothed rim, said rim thereby being blocked in its displaced position.

16. In a mechanical calendar as described, a pawl for feeding a date number indicating member and a day indicating member, a guide strip adjustable into two positions co-operating with said pawl, a fixed guide strip, said adjustable guide strip in its operating position forming an extension of said fixed guide strip and adapted to keep said pawl during its whole feeding path in engagement only with teeth provided on a day indicating member and rendering possible manually to displace said member independently of said date number indicating member.

17. In a mechanical calendar as described, a pawl for feeding a date number indicating member, an adjustable guide strip co-operating with said pawl, a foot connected to said guide strip which may be brought into operative or non-operative position by drawing said foot outside the base of the calendar or by placing said foot in said base.

18. In a mechanical calendar as described, driving means for date number and day indicating members comprising a shaft, a crank pin disc in driving connection with a shaft, a helical watch spring secured to the inner end of said shaft, a spring casing enclosing said spring and connected to the outer end of said spring, said casing being in driving connection with a clockwork.

19. A mechanical calendar as described, driving means for date number and day indicating members, a locking device for said driving means including a crank pin disc, a pin projecting from said crank pin disc, a cog-wheel adapted to be driven by another cog-wheel at a gearing ratio equal to 1:2 said latter cog-wheel being secured to the shaft of the hour hand of a clock work, a piston slidable in a bore of the first mentioned cog-wheel, a stop arm capable of assuming an operative and a non-operative position with a friction brake device, said pin controlling the position of the stop arm through the medium of the piston.

20. In a mechanical calendar as described, a driving means comprising a crank pin disc, a projecting pin on said disc, a braking member provided with a knob, a piston slidable in a bore through a cog-wheel against said knob, the end surface of said piston being larger than the bearing surface of said knob, said knob permitting the cog-wheel to turn a certain angle without said knob reaching beyond the surface of said piston, and the other end surface of said piston as well as of said knob being dimensioned in relation to the first mentioned bearing surface in such manner as to permit said piston upon the above mentioned turning of said cog-wheel thoroughly to slide out of the way of said pin.

21. In a mechanical calendar as described, driving means for date number and day indicating members, a locking device, a crank pin disc provided with a projecting tooth or cam, said locking device comprising a pawl provided with two guide wings, a detent pin disposed eccentrically upon a wheel forming part of a gear and resting against the free end of said pawl in its locked position, one guide wing bearing on the eccentric cam or tooth upon said crank pin disc.

22. In a mechanical calendar as described, driving means for date number and day indicating members, a locking device, a crank pin disc provided with a projecting tooth, said locking device comprising a pawl under the tension of a spring provided with two guide wings, one engageable with said tooth, the other of said guide wings provided with an oblique stop edge normally reaching into the path of a releasing pin disposed on a cog wheel driven by the hour hand shaft of a clock work, a gear wheel at the free end of said pawl provided with detent pins said releasing pin being adapted to bring said pawl, against the action of said spring, out of engagement with one detent pin and transitorily into locking engagement with an auxiliary detent pin disposed upon a gear wheel, said auxiliary detent pin being disposed at a greater radial distance than said first mentioned detent pin and behind same counted in the direction of rotation of said wheel so as to facilitate the free end of said pawl being moved in between said pins.

23. In a mechanical calendar as described, driving means for date number and day indicating members, a locking device, a crank pin disc provided with a projecting tooth, said locking device comprising a pawl provided with two guide wings, a gear wheel with a detent pin disposed eccentrically thereon, said gear being adapted to make nearly one revolution before engaging one of said guide wings and disengaging the other guide wing of said pawl from the projecting tooth of the crank pin disc.

24. In a mechanical calendar as described, a day and night indicating device comprising a hand and a disc, said disc being divided into a plurality of alternately light and dark sectors of equal size, a window through which said sectors are partially visible and step by step feeding means for said disc comprising two pins disposed diametrically upon a cog-wheel, said pins engaging a wheel rigidly secured to said disc and having a plurality of teeth.

AGNE KNÖS HERBERT GERMUNDSON.